US011371879B2

(12) United States Patent
Robbins et al.

(10) Patent No.: US 11,371,879 B2
(45) Date of Patent: Jun. 28, 2022

(54) MICROWAVE OSCILLATOR ULTRASOUND RECEIVER

(71) Applicant: Pinfold Technologies Limited., London (GB)

(72) Inventors: Thomas Robbins, London (GB); James Seddon, London (GB)

(73) Assignee: Pinfold Technologies Limited., London (GB)

( * ) Notice: Subject to any disclaimer, the term of this patent is extended or adjusted under 35 U.S.C. 154(b) by 146 days.

(21) Appl. No.: 16/656,998

(22) Filed: Oct. 18, 2019

(65) Prior Publication Data

US 2020/0225080 A1  Jul. 16, 2020

Related U.S. Application Data

(60) Provisional application No. 62/747,182, filed on Oct. 18, 2018.

(51) Int. Cl.
*G01H 11/06* (2006.01)
(52) U.S. Cl.
CPC .................... *G01H 11/06* (2013.01)
(58) Field of Classification Search
CPC ........ G01H 11/06; G01H 17/00; G01L 13/06; G01N 2291/014; G01N 29/036; H04R 1/04
See application file for complete search history.

(56) References Cited

U.S. PATENT DOCUMENTS

| 2008/0095490 | A1* | 4/2008 | Ashkenazi | G01H 9/004 385/13 |
| 2009/0232339 | A1* | 9/2009 | Motobayashi | H04R 1/04 381/369 |

(Continued)

FOREIGN PATENT DOCUMENTS

WO   WO-2011068417 A1 * 6/2011 ........... G01N 29/075

OTHER PUBLICATIONS

H. Ning, J. Wang, Q. Xiong, and L.-F. Mao, 'Design of Planar Dual and Triple Narrow-Band Bandstop Filters with Independently Controlled Stopbands and Improved Spurious Response', *Progress In Electromagnetics Research*, vol. 131, pp. 259-274, 2012.

(Continued)

*Primary Examiner* — David L Singer
(74) *Attorney, Agent, or Firm* — Pearl Cohen Zedek Latzer Baratz LLP

(57) ABSTRACT

A microwave oscillator ultrasound receiver which includes one or more pressure sensitive microwave resonators having a perturbable resonant frequency; one or more signal generators operable to generate one or more microwave carrier signals; one or more detectors configured to detect at one or more of: an amplitude and phase modulation of the one or more carrier microwave signals corresponding to resonance perturbations; and a computer processing device arranged to analyze any of the following: amplitude and phase modulation, and measure, based on the amplitude and phase modulation, an ultrasound signal, so that the resonance perturbations arise in response to the ultrasound signal being received by the pressure sensitive microwave resonator, the ultrasound signal effecting pressure changes on the pressure sensitive microwave resonator and thereby perturbing the perturbable resonant frequency.

12 Claims, 6 Drawing Sheets

(56) References Cited

U.S. PATENT DOCUMENTS

| | | | | |
|---|---|---|---|---|
| 2015/0237442 | A1* | 8/2015 | Maezawa | H04R 3/00 381/111 |
| 2015/0316511 | A1* | 11/2015 | Guo | G01N 29/221 398/140 |

OTHER PUBLICATIONS

P. C. Beard and T. N. Mills, 'Extrinsic optical-fiber ultrasound sensor using a thin polymer film as a low-finesse Fabry-Perot interferometer', Appl. Opt., AO, vol. 35, No. 4, pp. 663-675, Feb. 1996.

I. J. Bahl and S. S. Stuchly, 'Analysis of a Microstrip Covered with a Lossy Dielectric', IEEE Transactions on Microwave Theory and Techniques, vol. 28, No. 2, pp. 104-109, Feb. 1980.

R. Zeiser, T. Fellner, and J. Wilde, 'Capacitive strain gauges on flexible polymer substrates for wireless, intelligent systems', Journal of Sensors and Sensor Systems, vol. 3, No. 1, pp. 77-86, Apr. 2014.

J. W. Sanders, J. Yao, and H. Huang, 'Microstrip Patch Antenna Temperature Sensor', IEEE Sensors Journal, vol. 15, No. 9, pp. 5312-5319, Sep. 2015.

H. Huang, F. Farahanipad, and A. K. Singh, 'A Stacked Dual-Frequency Microstrip Patch Antenna for Simultaneous Shear and Pressure Displacement Sensing', IEEE Sensors Journal, vol. 17, No. 24, pp. 8314-8323, Dec. 2017.

V. V. Yakovlev et al., 'Ultrasensitive Non-Resonant Detection of Ultrasound with Plasmonic Metamaterials', Adv. Mater., vol. 25, No. 16, pp. 2351-2356, Apr. 2013.

I. S. Maksymov and A. D. Greentree, 'Plasmonic nanoantenna hydrophones', Scientific Reports, vol. 6, p. srep32892, Sep. 2016.

H. Wei and S. Krishnaswamy, 'Polymer micro-ring resonator integrated with a fiber ring laser for ultrasound detection', Optics Letters, vol. 42, No. 13, p. 2655, Jul. 2017.

H. Li, B. Dong, Z. Zhang, H. F. Zhang, and C. Sun, 'A transparent broadband ultrasonic detector based on an optical micro-ring resonator for photoacoustic microscopy', Scientific Reports, vol. 4, p. srep04496, Mar. 2014.

X. Chen and W. Fan, 'Ultrasensitive terahertz metamaterial sensor based on spoof surface plasmon', Scientific Reports, vol. 7, No. 1, p. 2092, May 2017.

X. Ren, K. Ren, and Y. Cai, 'Tunable compact nanosensor based on Fano resonance in a plasmonic waveguide system', Appl. Opt., AO, vol. 56, No. 31, pp. H1-H9, Nov. 2017.

S. Zhang, J. Chen, and S. He, 'Novel ultrasound detector based on small slot micro-ring resonator with ultrahigh Q factor', Optics Communications, vol. 382, pp. 113-118, Jan. 2017.

R. J. Colchester, C. A. Mosse, D. S. Bhachu, J. C. Bear, C. J. Carmalt, I. P. Parkin, B. E. Treeby, I. Papakonstantinou, and A. E. Desjardins, "Laser generated ultrasound with optical fibres using functionalised carbon nanotube composite coatings," Applied Physics Letters, vol. 104, No. 17, p. 173502, Apr. 2014, issn:0003-6951,1077-3118.doi:10.1063/1. 4873678.

P. Beard, "Biomedical photoacoustic imaging," en, Interface Focus, vol. 1, No. 4, pp. 602-631, Aug. 2011, issn: 2042-8898, 2042-8901. doi: 10.1098 / rsfs.2011.0028.

P. C. Beard and T. N. Mills, "Extrinsic optical-fiber ultrasound sensor using a thin polymer film as a low-finesse Fabry-Perot interferometer," EN, Applied Optics, vol. 35, No. 4, pp. 663-675, Feb. 1996, issn: 2155-3165. doi: 10.1364/AO.35.000663.

M. D. Sherar and F. S. Foster, "The design and fabrication of high frequency poly(vinylidene fluoride) transducers," Ultrasonic Imaging, vol. 11, No. 2, pp. 75-94, Apr. 1989, issn: 0161-7346. doi: 10.1016/ 0161-7346(89)90001-1.

J. A. Guggenheim, J. Li, T. J. Allen, R. J. Colchester, S. Noimark, O. Ogunlade, I. P. Parkin, I. Papakonstantinou, A. E. Desjardins, E. Z. Zhang, and P. C. Beard, "Ultrasensitive plano-concave optical microresonators for ultrasound sensing," En, Nature Photonics, vol. 11, No. 11, p. 714, Oct. 2017, issn: 1749-4893. doi: 10.1038/s41566-017-0027-x.

P. C. Beard and T. N. Mills, "Miniature optical fibre ultrasonic hydrophone using a Fabry-Perot polymer film interferometer," Electronics Letters, vol. 33, No. 9, pp. 801-803, Apr. 1997, issn: 0013-5194. doi: 10.1049/el:19970545.

A. Caronti, G. Caliano, R. Carotenuto, A. Savoia, M. Pappalardo, E. Cianci, and V. Foglietti, "Capacitive micromachined ultrasonic transducer (CMUT) arrays for medical imaging," Microelectronics Journal, vol. 37, No. 8, pp. 770-777, Aug. 2006, issn:0026-2692. doi: 10.1016/j.mejo.2005.10.012.

S. Zhou and J. A. Hossack, "Reducing inter-element acoustic crosstalk in capacitive micromachined ultrasound transducers," IEEE Transactions on Ultrasonics, Ferroelectrics, and Frequency Control, vol. 54, No. 6, pp. 1217-1228, Jun. 2007, issn: 0885-3010. doi: 10.1109/TUFFC.2007.375.

E. Maneas, W. Xia, O. Ogunlade, M. Fonseca, D. I. Nikitichev, A. L. David, S. J. West, S. Ourselin, J. C. Hebden, T. Vercauteren, and A. E. Desjardins, "Gel waxbased tissue-mimicking phantoms for multispectral photoacoustic imaging," EN, Biomedical Optics Express, vol. 9, No. 3, pp. 1151-1163, Mar. 2018, issn: 2156-7085. doi: 10.1364/BOE.9.001151.

F. Dunn and F. J. Fry, Ultrasonic Threshold Dosages for the Mammalian Central Nervous System, IEEE Transactions on Biomedical Engineering, vol. BME-18, No. 4, pp. 253-256, Jul. 1971.

A. A. Plumb, N. T. Huynh, J. Guggenheim, E. Zhang, and P. Beard, Rapid volumetric photoacoustic tomographic imaging with a Fabry-Perot ultrasound sensor depicts peripheral arteries and microvascular vasomotor responses to thermal stimuli, Eur Radiol, vol. 28, No. 3, pp. 1037-1045, Mar. 2018.

R. K. Poduval et al., 'Optical fiber ultrasound transmitter with electrospun carbon nanotube-polymer composite', Appl. Phys. Lett., vol. 110, No. 22, p. 223701, May 2017.

P. C. Beard, F. Perennes, and T. N. Mills, 'Transduction mechanisms of the Fabry-Perot polymer film sensing concept for wideband ultrasound detection', IEEE Transactions on Ultrasonics, Ferroelectrics, and Frequency Control, vol. 46, No. 6, pp. 1575-1582, Nov. 1999.

Y. Li, W. Li, and Q. Ye, 'A Reconfigurable Triple-Notch-Band Antenna Integrated with Defected Microstrip Structure Band-Stop Filter for Ultra-Wideband Cognitive Radio Applications', International Journal of Antennas and Propagation, 2013.

* cited by examiner

Transmission spectra of microwave oscillator ultrasound receivers covered with 19.5 μm and 29.5 thick superstrate layers respectively Relationship between superstrate layer thickness and microwave resonance shift

MICROWAVE OSCILLATOR ULTRASOUND RECEIVER

CROSS-REFERENCE TO RELATED APPLICATION

This application claims the benefit of U.S. Provisional Patent Application No. 62/747,182 filed Oct. 18, 2018, which is incorporated by reference herein in its entirety.

FIELD OF THE INVENTION

The present invention relates generally to an ultrasound receiver and more particularly to a microwave oscillator ultrasound receiver configured for sensitivity over a wide acoustic spectrum.

BACKGROUND OF THE INVENTION

Ultrasound imaging techniques are widely employed in a number of fields, most notably including medical fields where diagnostic sonography or ultrasonography applications are critical to generating images of internal body structures (e.g., of tendons, muscles, joints, blood vessels, internal organs, and the like). Some ultrasound imaging techniques that entail generating short, broadband pulses (e.g., laser generated ultrasound and photoacoustics) or require detection of ultrasound frequencies at higher-order harmonics of the transmitted pulse (e.g., harmonic ultrasound imaging and elastography) are known to require receivers that are sensitive over a wide acoustic spectrum. Piezoceramic transducers are often used in these known techniques and, owing to the high acoustic impedance of piezoceramics, may be advantageously manufactured to resonate when coupled to low Young's modulus media such as biological tissue or water. Piezoceramic transducers are, however, typically sensitive only to signals received proximate to their resonant frequency and consequently lack applicability for wideband usage.

Wideband receivers made from piezopolymers, such as Polyvinylidene fluoride (PVDF) hydrophones, may, in some circumstances, offer better broadband performance; however, this may come at the expense of peak sensitivity. Further, in order to allow a wide acoustic angle of acceptance and permit high resolution field sampling, the sensing element should ideally be made as small as possible. Such attempts have, however, resulted in reduced sensitivity and reduced performance, for example when conducting high contrast imaging and the like.

Ultrasound imaging arrays, which typically allow transmission and reception of ultrasound waves over a plurality of points on a one-dimensional (1D) line or two-dimensional (2D) surface, are often addressed by configuring the state of a number of radio frequency switches between each ultrasound pulse. These arrays are, however, known to be extremely challenging to design, in particular for 2D arrays, owing to the difficulty entailed in connecting each element to its own respective electrical cable. The arrays generally must also be fabricated/designed such that they are robust to electrical crosstalk between elements. Further, the time delay associated with changing the state of each switch may limit the acquisition frame rate of the array.

Ultrasound imaging arrays comprising only receivers are also known in the art, such as in the field of Passive Acoustic Mapping/Monitoring (PAM). PAM may, for example, be used in Focused Ultrasound (FUS) therapies to generate direct feedback for the targeting of cancerous tissues and the like with focused beams of ultrasound. However, for the aforementioned reasons, devices capable of 3D, real-time PAM are extremely challenging to develop using current known methods.

It is, therefore, an object of the present invention to provide a cost effective and easily fabricated ultrasound receiver with wide acoustic spectrum sensitivity which, optionally, may be incorporated into the design of imaging arrays.

SUMMARY OF THE PRESENT INVENTION

A microwave oscillator ultrasound receiver is disclosed herein. The microwave oscillator ultrasound receiver comprises: one or more pressure sensitive microwave resonators having a perturbable resonant frequency; one or more signal generators operable to generate one or more microwave carrier signals; one or more detectors configured to detect at least one of: an amplitude and phase modulation of said one or more carrier microwave signals corresponding to resonance perturbations; and a computer processing device arranged to analyze said at least one of: amplitude and phase modulation, and therefrom measure an ultrasound signal; wherein said resonance perturbations arise in response to said ultrasound signal being received by said pressure sensitive microwave resonator, said ultrasound signal effecting pressure changes on said pressure sensitive microwave resonator and thereby perturbing said perturbable resonant frequency.

A method of measuring an ultrasound signal is also disclosed herein. The method comprises: receiving, at a pressure sensitive microwave resonator having a perturbable resonant frequency, said ultrasound signal; detecting, using a detector, at least one of: an amplitude and phase modulation of one or more carrier microwave signals corresponding to resonance perturbations, said resonance perturbations arising in response to said ultrasound signal being received by said pressure sensitive microwave resonator; and analyzing, using a computer processing device, said at least one of: amplitude and phase modulation, and therefrom measuring said ultrasound signal; wherein said ultrasound signal effects pressure changes on said pressure sensitive microwave resonator and thereby perturbs said perturbable resonant frequency.

These and other advantages of the present invention are set forth in detail in the following description.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
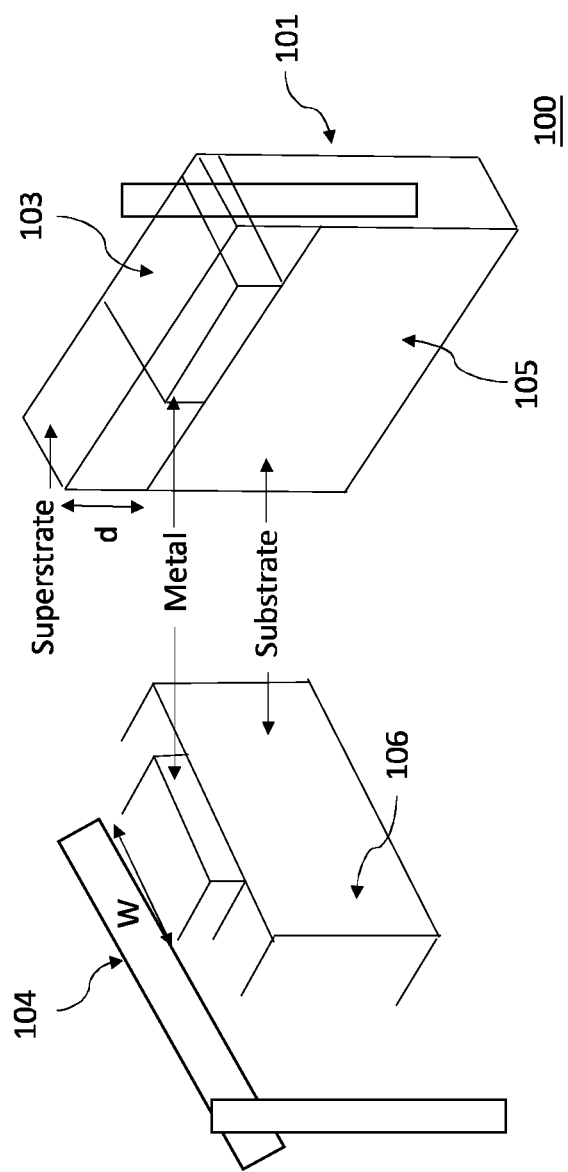
FIG. 1 is a schematic diagram illustrating exemplary architecture of a microwave oscillator ultrasound receiver according to some embodiments of the invention.

It will be appreciated that, for simplicity and clarity of illustration, elements shown in the figures have not necessarily been drawn to scale. For example, the dimensions of some of the elements may have been exaggerated relative to other elements for clarity. Further, where considered appropriate, reference numerals may be repeated among the figures to indicate corresponding or analogous elements.

DETAILED DESCRIPTION OF THE INVENTION

With specific detailed reference now to the drawings, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description, taken with the drawings, makes apparent to those skilled in the art how the several forms of the invention may be embodied in practice.

Before the embodiments of the invention are explained in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

The following term definitions are provided to aid in construal and interpretation of the invention.

The term "perturbable" refers generally to the capacity of a system or process to deviate from a regular/ordinary state or path owing to some form of external influence or stimuli. In the present context, perturbable may refer to the capacity of a resonant frequency to be perturbed/shifted/modified, for example due to the application of an external signal and/or pressure generating stimulus.

The term "resonator" refers generally to a device or system that exhibits confinement of energy and resonance/oscillatory behavior at specific frequencies known as "resonant frequencies". A resonance may be detected, for example, by observing a corresponding drop in transmitted or reflected power. Resonators may be configured to resonate either electromagnetically or mechanically (e.g., acoustic resonance) and may typically be used for the purposes of generating waves of specific frequencies and/or selecting specific frequencies from a signal.

The term "oscillator" refers generally to a system or arrangement which exhibits a regular or irregular fluctuating physical parameter such as, for example, an electromagnetic field or a mechanical strain.

The terms "cavity resonator" and "microwave cavity" refer generally to a resonator comprising a closed, possibly metal, structure that has been configured to confine electromagnetic fields, in particular those falling within the microwave region of the electromagnetic spectrum. A "microwave resonator" refers generally to a structure which may or may not comprise one or more microwave cavities, however for the purpose of illustration the terms "cavity resonator", "microwave resonator" and "microwave cavity" may all be considered analogous. A microwave resonator may be any one-dimensional (1D), two-dimensional (2D) or three-dimensional (3D) structure and may comprise one or more types of conductor and/or dielectric. A microwave resonator may further act to support oscillations preferentially at a series of frequencies (i.e., at resonant frequencies) with electromagnetic energy typically confined to the immediate vicinity of the structure. Ohmic losses from the resonator may arise owing to the finite conductivity of the structure, and dielectric losses may arise owing to the finite loss tangent of the dielectric parts. However, both of these losses may be ameliorated by using low-loss dielectrics and low-resistivity metals, thereby resulting in high quality factors ("Q factors"). In the present context, a microwave resonator may be configured to exhibit pressure sensitivity, such that application of an external pressure (e.g., in the form of incident ultrasound wave pulses) may result in perturbations/shifting/modification in the resonant frequency of the structure/cavity (e.g., due to boundary deformation/contraction).

The term "waveguide" refers generally to a structure configured to guide waves, such as electromagnetic waves or sound waves, with minimal loss of energy, for example by restricting expansion in one or more dimensions.

The terms "envelope" and "amplitude envelope" refer generally to a smooth curve outlining/tracking the extremes of an oscillating signal, for example as a function of time, space, angle or the like. The terms "phase modulation" and "amplitude modulation" refer generally to the modulation of the phase or amplitude respectively of an oscillating signal, for example as a function of time, space, angle or the like. For the purposes of the present invention, the terms envelope, amplitude envelope, and amplitude modulation may be considered equivalent.

The term "microstrip" refers generally to an electrical transmission line, possibly fabricated using printed circuit board technology, that is operable to convey microwave-frequency signals.

A new type of electronic ultrasound receiver is proposed herein with sensitivity which derives from a compact planar microwave resonator. In some embodiments, the compact planar microwave resonator may be adapted from defected microstrip architecture as proposed by Ning et al., in "Design of Planar Dual and Triple Narrow-Band Bandstop Filters with Independently Controlled Stopbands and Improved Spurious Response", which is incorporated herein by reference. Tapered impedance matching regions are provided to enable the device to be conveniently and compactly coupled to microstrips (e.g., 50 Ohm microstrips) on the same substrate, thereby allowing a carrier frequency to be coupled into and out of the compact planar microwave resonator. Further, an innovative tailored-Young's modulus (i.e., soft/deformable or hard/rigid, depending on application) covering layer is included. In order to for wide-band ultrasound reception to be enabled, materials are selected such that the Young's modulus of the substrate is significantly larger than that of the superstrate, and the superstrate thickness is optimized.

FIG. 1 is a schematic diagram illustrating exemplary architecture of a microwave oscillator ultrasound receiver according to embodiments of the invention. In particular, FIG. 1 discloses a cross-sectional view of a microwave oscillator ultrasound receiver 100, both with 101 and without 102 application of a tailored-Young's modulus covering/superstrate layer 103. As illustrated, the arrangement also comprises a conductive metal microstrip line 104 into which a slot pattern is etched (for example in the shape of a hairpin, as adapted from Ning et al.), a ground plane layer 105, and a substrate layer 106.

Figure 2:
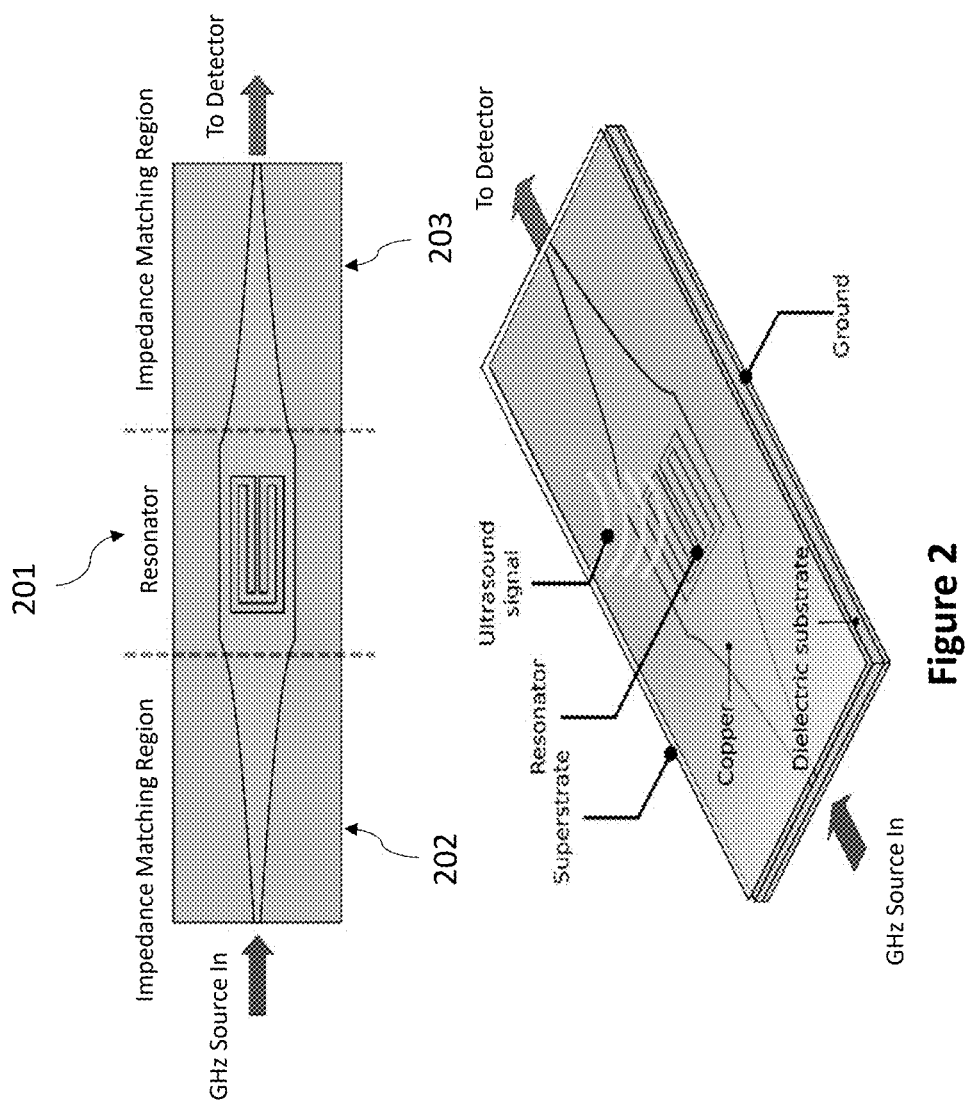
FIG. 2 is a schematic diagram illustrating exemplary architecture of a microwave oscillator ultrasound receiver according to some embodiments of the invention.

These elements may be formed together, as shown, to create a pressure-sensitive microwave resonator. The pressure-sensitivity results from the interaction between the state of the superstrate layer (which may include changes to structural, mechanical, magnetic or dielectric properties and/or changes to magnetic/electric polarization) and the evanescent electromagnetic field in the vicinity of the microwave resonator. In particular, FIG. 2 depicts a further schematic diagram illustrating exemplary architecture of a microwave oscillator ultrasound receiver according to embodiments of the invention. The resultant composite structure of the elements shown in FIG. 1 is a pressure-sensitive microwave resonator 201, to which two tapered impedance matching regions 202, 203 may be coupled, thereby allowing carrier frequency to be transmitted into and out of the pressure sensitive microwave resonator. The tailored-Young's modulus covering/superstrate layer has high electromagnetic permittivity and, optionally, low acoustic impedance relative to the substrate. As the layer deforms owing to reception of an ultrasound signal (i.e., which applies pressure to the superstrate layer), the resonance of the pressure-sensitive microwave resonator is shifted, thereby allowing the incident ultrasound signal to be measured. The mechanism for producing this shift may include (but is not limited to): movement of the boundary between the electric permittivity of the superstrate and the surrounding space; changes to a bulk physical property of the superstrate resulting from the applied pressure; and/or variations in the magnetic/electric polarization of the superstrate resulting from the applied pressure. These changes may alter the mean permittivity in the vicinity of the resonator, thereby causing the resonance to shift. Accordingly, as will be understood by those skilled in the art, the proposed defected microstrip structure implements a highly compact LC (inductor-capacitor) resonator, but one whose resonant frequency depends on local refractive index.

The architecture depicted in FIGS. 1 and 2 may be fabricated using any appropriate relative dimensions, as will be appreciated by those skilled in the art. One exemplary arrangement has been trialed having defected microstrip hairpin dimensions of 2.2×7 mm, dielectric substrate of width 0.48 mm, and resonance of roughly 1.8 GHz. This arrangement was transferred onto a laminate circuit board with high dielectric constant (DC=10.3) using a standard chemical etch process and connectorized with soldered SMA connectors. A choice of coatings were then applied, each having high electrical permittivity and a range of Young's modulus. Such choices included, for example, Paralyne-C, PDMS and black latex paint.

As will be appreciated in view of the aforementioned, the proposed electronic ultrasound receiver is advantageous as it requires no MEMS fabrication processes to be produced and thus offers superior flexibility in construction. The simplicity of the construction improves the ease with which acoustic lensing may be incorporated, and further preserves all advantages of a fully electronic sensor, such as low fabrication cost, low power consumption and convenient/easy multiplexing. Furthermore, the components required to address the sensor and extract the ultrasound signal, such as microwave synthesizers, downconverters, demodulators and analogue-to-digital converters, are readily available as mass-produced integrated circuits, and may be integrated by standard pick-and-place and surface mount soldering techniques employed widely throughout the electronics industry.

Additionally, since each sensing element may be arranged to carry ultrasound signal on an independent/discrete microwave frequency band, electrical cross-talk/interference is substantially eliminated. Further, many elements can be addressed near-simultaneously by rapidly changing the tuning of the microwave oscillator or alternatively using multiple superimposed oscillator frequencies. Moreover, as the sensing mechanism is based on electromagnetic resonance, the effective length of interaction between the ultrasound field and the sensor is scale-invariant and thus allows for a reduction in element size without any corresponding loss in sensitivity.

Figure 3:
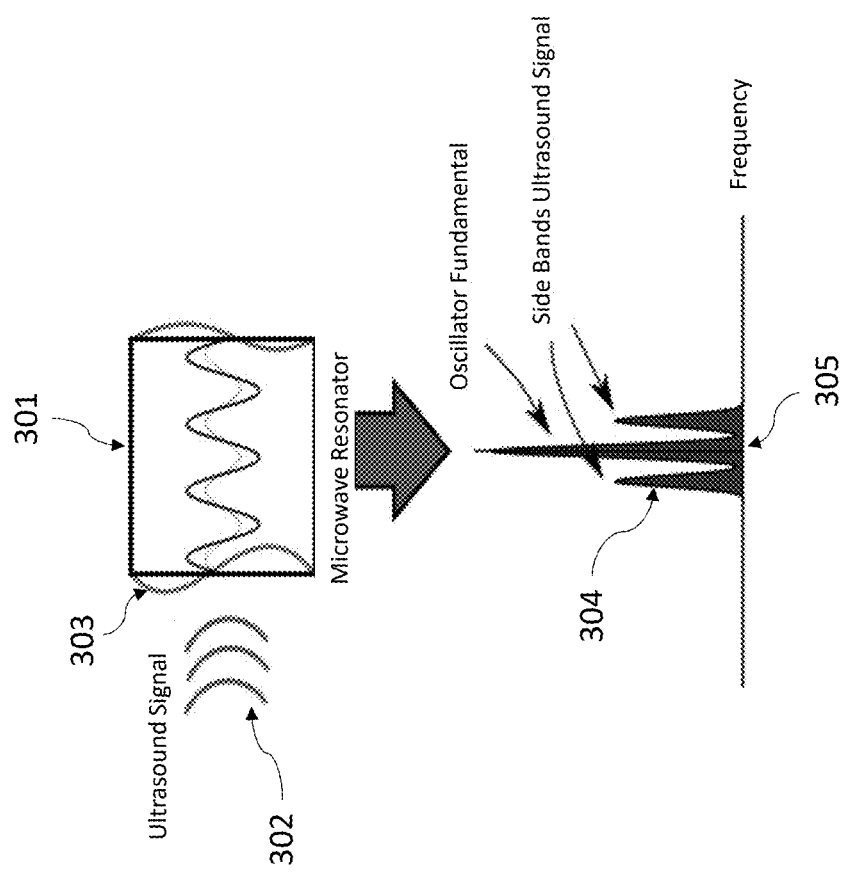
FIG. 3 is a schematic diagram illustrating exemplary functionality of a microwave oscillator ultrasound receiver according to some embodiments of the invention.

FIG. 3 is a schematic diagram illustrating exemplary functionality of a microwave oscillator ultrasound receiver according to embodiments of the invention. A pressure-sensitive microwave resonator 301 according to the design illustrated in FIGS. 1 and 2 is included and is driven at, or proximate to, its resonant frequency, thereby exciting the eigenmode of the electromagnetic structure (i.e., analogous to triggering and reinforcing of a standing wave within a microwave cavity). When the pressure-sensitive microwave resonator 301 is subjected to an ultrasound signal 302, the tailored-Young's modulus covering/superstrate layer of the pressure-sensitive microwave resonator 301 is deformed 303 (i.e., at the boundaries) owing to pressure exerted by the ultrasound signal 302. This, in turn, causes the resonant frequency of the microwave cavity in the pressure-sensitive microwave resonator to be perturbed. The amplitude envelope (or phase modulation) 304 of this perturbation can be detected and observed, for example using an oscilloscope or the like, and used to measure metrics associated with the incident ultrasound signal 302.

More specifically, the pressure-sensitive microwave resonator 301 is excited near its fundamental mode at frequency $\omega_0$. As the boundary conditions of the resonator change owing to the incident ultrasound signal 302, the amplitude and phase of the carrier signal 305 is modulated. In an exemplary 1D system, this may be mathematically represented by the equation:

$$E = A \cos(\omega_0 t),$$

where E is the electric field component of the microwave oscillation, $\omega_0$ is its angular frequency, and t is time. For the purpose of illustration, we consider here only the case where the amplitude is modulated. The amplitude A is correspondingly modulated by the ultrasound signal with frequency $\omega_u$ and amplitude $A_u$, giving:

$$E = A_u \cos(\omega_u t)\cos(\omega_0 t) = A_u \cos[(\omega_0 + \omega_u)t]/2 + A_u \cos[(\omega_0 - \omega_u)t]/2.$$

The ultrasound signal may thus be detected by analyzing the 'sidebands' 304 of the high-frequency signal at $\omega_0 + \omega_u$ and $\omega_0 - \omega_u$. As will be appreciated by those skilled in the art, for a broadband ultrasound pulse, these equations may be adapted such that the signal is represented by the summation of the continuum of frequencies $\{\omega_u\}$ with amplitudes given by their Fourier components $\{A_u\}$.

Figure 4:
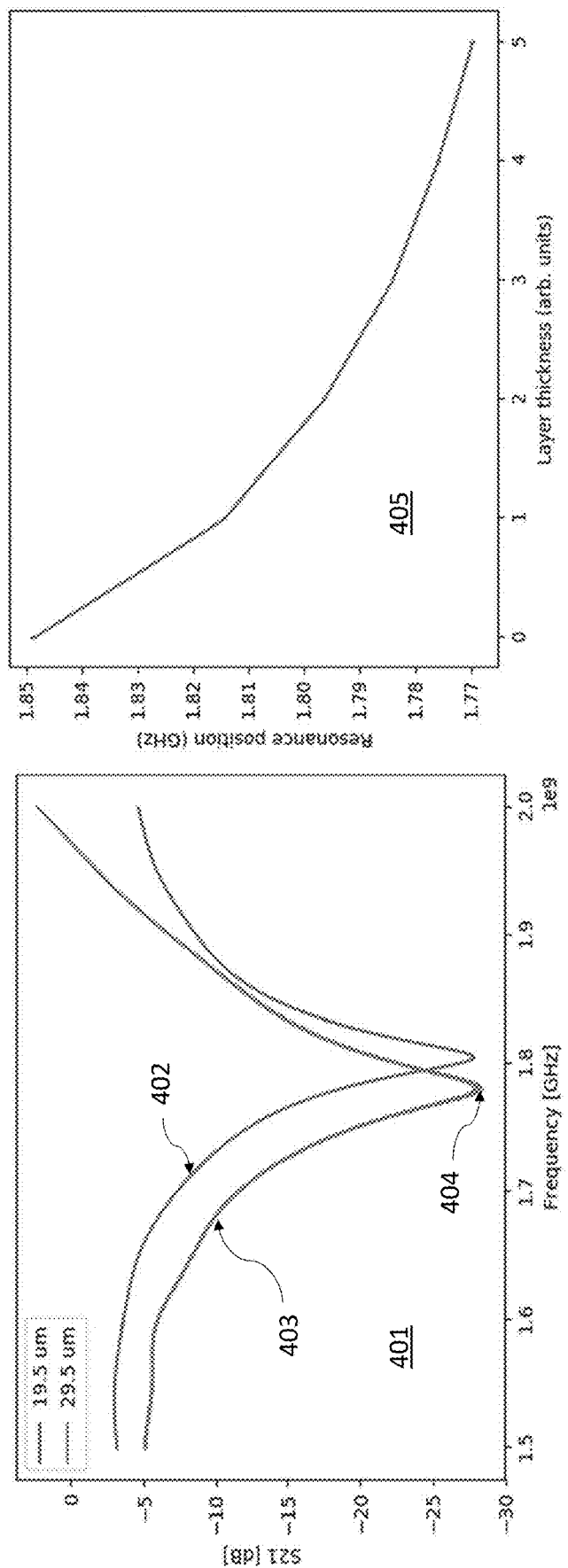
FIG. 4 is a series of graphs illustrating experimental results of a microwave oscillator ultrasound receiver according to some embodiments of the invention.

Proof of this concept is illustrated generally in FIG. 4, where a series of graphs illustrating experimental results of a microwave oscillator ultrasound receiver according to some embodiments of the invention are shown. In order to detect ultrasound waves, most known/existing detectors either transduce directly into current by the piezoelectric effect or use laser interferometry to detect small strains in suitable materials. The proposed microwave oscillator ultrasound receiver instead works by modulating a GHz-range electromagnetic carrier signal with an ultrasound amplitude and/or phase modulation. This is broadly achieved, as mentioned above, by covering a waveguide coupled resonator with a thin superstrate of high electrical permittivity and low Young's modulus.

As the superstrate layer is deformed by an ultrasound signal, the effective electrical permittivity of the waveguide changes, the resonance is perturbed/shifted, and the amplitude and/or phase of the carrier signal is modulated. In order for this phenomenon to be observed, an experimental arrangement was devised and fabricated, as mentioned above, and the experimental results in FIG. 4 were generated. In the left graph 401 of FIG. 4, two transmission spectra are shown. The first trace 402 comprises the transmission spectrum of a microwave oscillator ultrasound receiver covered with a 19.5 μm thick superstrate layer formed by Parylene-C deposition. The second trace 403 comprises the transmission spectrum of a microwave oscillator ultrasound receiver covered with a 29.5 μm thick superstrate layer formed by Parylene-C deposition. As will be appreciated by those skilled in the art, the responses in both arrangements (which were $S_{21}$ measurements made using a spectrum analyzer) depict a clear superstrate-induced redshift 404 which, at a fixed RF tune point (i.e., when tuning at, or proximate to, the resonant frequency of the microwave resonator), will result in a change in the transmitted microwave power. In the right graph 405, a relationship between superstrate layer thickness and microwave resonance shift is shown, demonstrating the sensitivity of the device to superstrate thickness.

Figure 5:
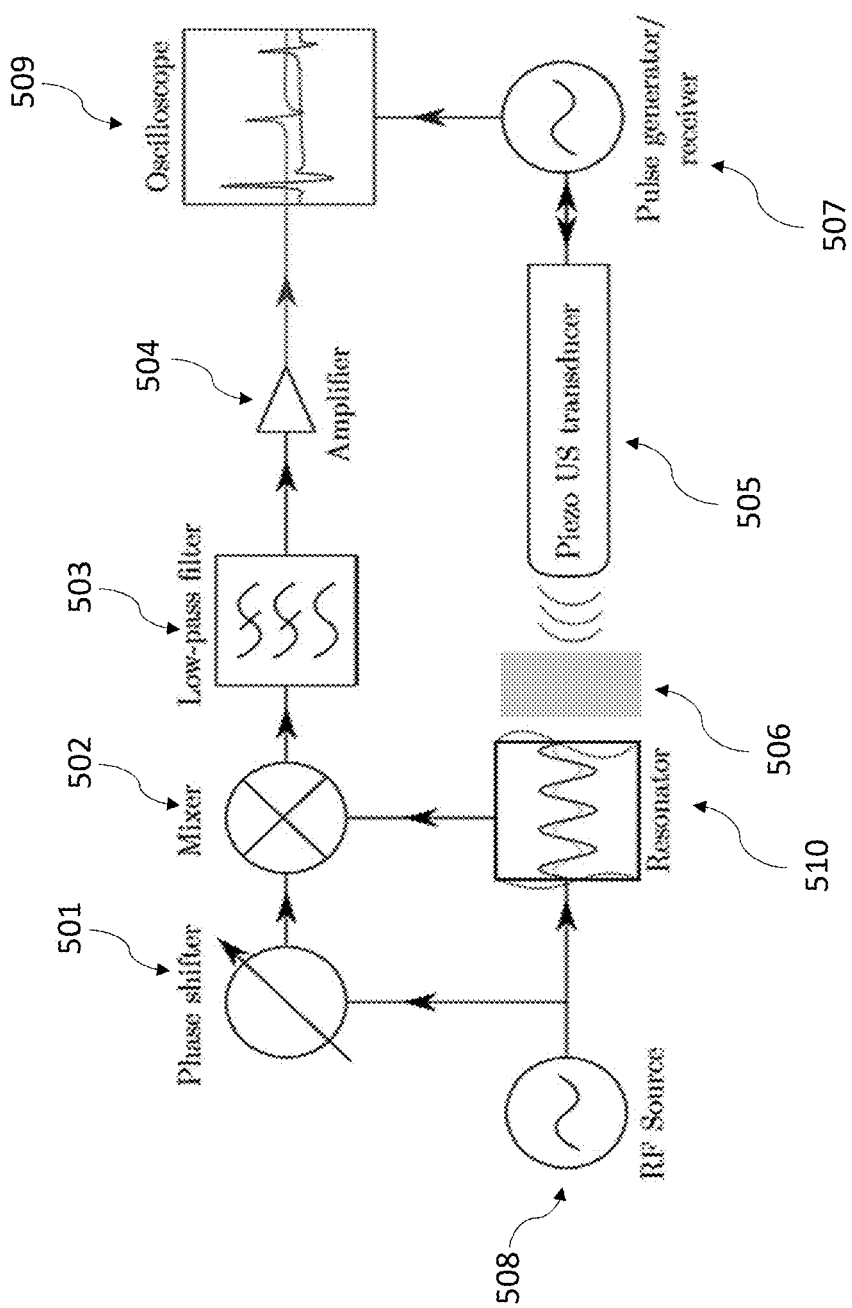
FIG. 5 is a schematic diagram illustrating an exemplary system arrangement for verifying an ultrasound measurement obtained using a microwave oscillator ultrasound receiver according to some embodiments of the invention.

The resonance characteristics of a microwave oscillator ultrasound receiver may, when fabricated, be characterized (i.e., using a network analyzer, such as the EC5071C ENA Series Network Analyzer by Aligent Technologies®) to measure transmission and reflection spectra. From this characterization, the resonant frequency/resonance of the arrangement may be determined and a system arrangement, such as the one depicted in FIG. 5, may be employed to measure the sensitivity of the device to ultrasound and, optionally, verify ultrasound measurements obtained. In particular, the exemplary arrangement in FIG. 5 includes a homodyne detector implemented using a power splitter (e.g., ANRITSU K241B), a phase shifter 501 (e.g., ARRA9426R), and a frequency mixer 502 (e.g., Mini-Circuits ZXO5C4S). The output from these components is routed through a lowpass filter 503 (e.g., passband from DC to 80 MHz) and a high gain amplifier 504 (e.g., Olympus 5072PR). A piezo ultrasound transducer 505 (e.g., Harisonic 13-0504-R) is also included and coupled to top side (i.e., superstrate layer) of the microwave oscillator ultrasound receiver 510 via a spacer 506 (e.g., a block of pure gel wax) and driven by a train of pulses at the acoustic resonant frequency of the piezo ultrasound transducer (transmitter) 505 (i.e., 5 MHz) from an ultrasound pulse generator and receiver 507 (e.g., Olympus 5077PR).

A high-frequency microwave source 508 (e.g., Keysight N9310A RF Signal Generator) is tuned near the quadrature (point of greatest slope) of the microwave oscillator ultrasound receiver's electromagnetic resonance and connected. Tuning for this purpose may be achieved by running the signal from the microwave oscillator ultrasound receiver through a power detector (e.g., Pasternack PE8014) and taking voltage readings whilst changing frequency of the RF source. An oscilloscope 509 (e.g., Agilent Technologies DSO-X 3024A) is also included and setup/connected to depict traces from both the piezo ultrasound transducer 505 and microwave oscillator ultrasound receiver 510.

Figure 6:
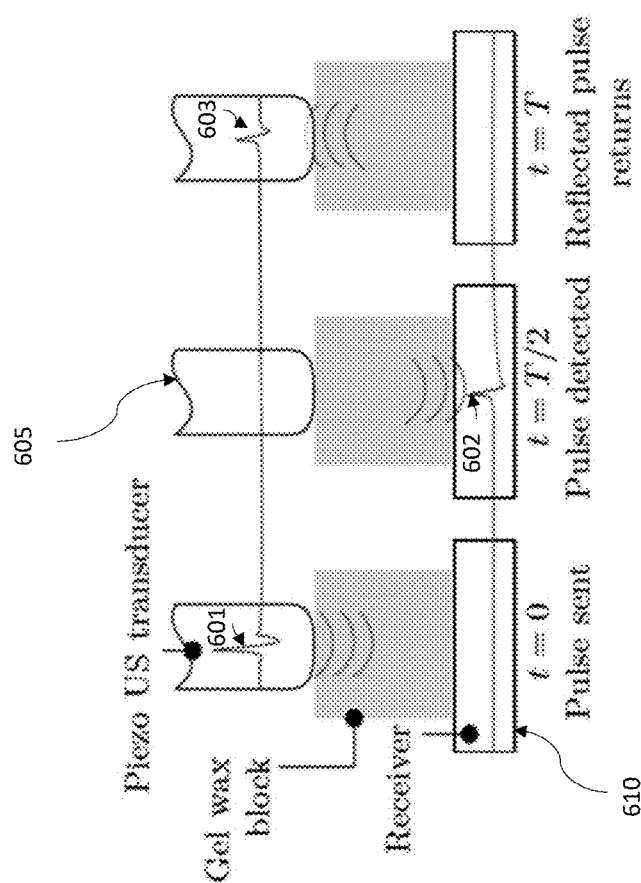
FIG. 6 is a schematic diagram illustrating an exemplary system arrangement for verifying an ultrasound measurement obtained using a microwave oscillator ultrasound receiver according to some embodiments of the invention.

When operated, ultrasound pulses emitted by the pulse generator 507 reflect off the microwave oscillator ultrasound receiver 510 back towards the piezo ultrasound transducer 505. Three pulses are thus observed, as illustrated generally in FIG. 6. An initial pulse 601 representing the ultrasound generated at the piezo ultrasound transducer 505/605 is evident at time t=0, and a second pulse 603 after the time taken to make a return trip has elapsed at time t=T. The response from the microwave oscillator ultrasound receiver 510/610 itself is observed at time t=T/2 as an intermediate pulse 602, half-way between the two piezo ultrasound transducer 505/605 pulses at t=0 601 and t=T 603.

Further verification of the ultrasound measurement recorded by the microwave oscillator ultrasound receiver 510/610 may be obtained by pressing the piezo ultrasound transducer 505/605 closer to the microwave oscillator ultrasound receiver 510/610, thereby deforming the spacer 506 and reducing the path length between the piezo ultrasound transducer 505/605 and microwave oscillator ultrasound receiver 510/610. Provided the intermediate pulse 602 remains at time t=T/2, doubt as to the origin of the electrical signal is eliminated owing to the configuration of the experimental apparatus.

In some embodiments, one or more pressure sensitive microwave resonators may comprise a deformable superstrate layer, possibly disposed onto a rigid dielectric substrate, the deformable superstrate layer being optimized for wideband ultrasound reception and having a high electrical permittivity (e.g., above 1.5 at 1 GHz). Optionally, the deformable superstrate layer may also have (i.e., relative to the rigid substrate) low acoustic impedance and low Young's modulus (i.e., below 1 GPa). In alternative embodiments, PDMS may be used, owing to its high relative electrical permittivity (1.9 at 10 GHz) and low Young's modulus (400 kPa) relative to that of the substrate.

In some embodiments, the deformable superstrate layer may be configured, when deformed, to vary the effective electrical permittivity of a waveguide of said pressure sensitive microwave resonator.

In some embodiments, the deformable superstrate layer may be configured to deform on receipt of said ultrasound signal.

In some embodiments, the deformable superstrate layer may be configured, and such changes in applied pressure (e.g., by the incident ultrasound signal) result in: the movement of the boundary between the electric permittivity of the superstrate and a surrounding space; the change of some bulk physical property of the superstrate resulting from the applied pressure; and/or a change in the magnetic/electric polarization of the superstrate resulting from the applied pressure. These changes may in turn alter the mean electrical permittivity or magnetic permeability in the vicinity of the resonator, thereby causing the resonance to shift.

In some embodiments, deformations in the deformable superstrate layer may effect resonance perturbations and modulate at least one of: the amplitude and phase of the microwave carrier signal.

In some embodiments, one or more pressure sensitive microwave resonators may comprise a defected microstrip structure, possibly in the shape of a hairpin.

In some embodiments, the microwave oscillator ultrasound receiver may further comprise one or more tapered impedance matching regions operable to couple with adjoining microstrips.

In some embodiments, the microwave oscillator ultrasound receiver may comprise one or more resonator structures with one or more different resonant frequencies.

In some embodiments, the microwave oscillator ultrasound receiver may comprise a plurality of pressure sensitive microwave resonators, a plurality of impedance matching regions and/or a plurality of transmission lines/microstrips. Accordingly, as will be appreciated by those skilled in the art, the invention is not limiting in this regard.

In some embodiments, one or more pressure sensitive microwave resonators may comprise a resonant frequency of 5 GHz or less. In yet further embodiments, one or more pressure sensitive microwave resonators may comprise a resonant frequency of 3 GHz or less, or preferably 1 GHz or more.

In some embodiments, one or more pressure sensitive microwave resonator may comprise a resonant frequency of over 5 GHz.

In some embodiments, the microwave oscillator ultrasound receiver may comprise one or more pressure sensitive microwave resonators with resonant frequencies substantially in the range of 15 to 27 GHz.

In some embodiments, the microwave oscillator ultrasound receiver may comprise one or more parallel microstrips, each supporting one or more pressure sensitive microwave resonators.

In some embodiments, the microwave oscillator ultrasound receiver may be fabricated and integrated into a single circuit, for example on a printed circuit board.

A method of verifying an ultrasound signal measurement is also proposed. The verification method may comprise the steps of: characterizing a resonance of the pressure sensitive microwave resonator and thereby determining transmission and reflection spectra; connecting a high-frequency microwave source to the pressure sensitive microwave resonator, the high frequency microwave source being tuned proximate to a quadrature of said resonance; driving, using an ultrasound pulse transceiver, a train of ultrasound pulses through a piezoelectric transducer, the ultrasound pulses being applied to the pressure sensitive microwave resonator via a spacer; detecting, using an oscilloscope, signal trace pulses from both of the pressure sensitive microwave resonator and the piezoelectric transducer; and determining intervals between the signal trace pulses and therefrom verifying the ultrasound signal measurement.

In some embodiments, the method of verifying an ultrasound signal measurement may further comprise the steps of: pressing the piezoelectric transducer against the spacer thereby deforming the spacer and reducing a distance between the piezoelectric transducer and the pressure sensitive microwave resonator; and determining intervals between the signal trace pulses and therefrom further verifying the ultrasound signal measurement.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A microwave oscillator ultrasound receiver, comprising:
    one or more pressure sensitive microwave resonators having a perturbable resonant frequency;
    one or more signal generators operable to generate one or more microwave carrier signals;
    one or more detectors configured to detect at least one of: an amplitude and phase modulation of said one or more carrier microwave signals corresponding to resonance perturbations; and
    a computer processing device arranged to analyse said at least one of: amplitude and phase modulation, and therefrom measure an ultrasound signal;
    wherein said resonance perturbations arise in response to said ultrasound signal being received by said pressure sensitive microwave resonator, said ultrasound signal effecting pressure changes on said pressure sensitive microwave resonator and thereby perturbing said perturbable resonant frequency.

2. The microwave oscillator ultrasound receiver according to claim 1, wherein each of said one or more pressure sensitive microwave resonators comprises a deformable superstrate layer optimized for wideband ultrasound reception, said deformable superstrate layer having a high electrical permittivity, low acoustic impedance and low Young's modulus.

3. The microwave oscillator ultrasound receiver according to claim 2, wherein said deformable superstrate layer is configured, when deformed, to vary the effective electrical permittivity of a waveguide of said pressure sensitive microwave resonator.

4. The microwave oscillator ultrasound receiver according to claim 3, wherein said deformable superstrate layer is configured to deform on receipt of said ultrasound signal.

5. The microwave oscillator ultrasound receiver according to claim 2, wherein deformations in said deformable superstrate layer effect said resonance perturbations and modulate at least one of: the amplitude and phase of said microwave carrier signal.

6. The microwave oscillator ultrasound receiver according to claim 1, wherein each of said one or more pressure sensitive microwave resonators comprises a defected microstrip structure.

7. The microwave oscillator ultrasound receiver according to claim 1, wherein said microwave oscillator ultrasound receiver further comprises one or more tapered impedance matching regions operable to couple with adjoining microstrips.

8. The microwave oscillator ultrasound receiver according to claim 1, wherein one or more of said pressure sensitive microwave resonator comprises a resonant frequency of 1 GHz or more.

9. The microwave oscillator ultrasound receiver according to claim 1, integrated into a single circuit on a printed circuit board.

10. A method of measuring an ultrasound signal, comprising:
    receiving, at a pressure sensitive microwave resonator having a perturbable resonant frequency, said ultrasound signal;
    detecting, using a detector, at least one of: an amplitude and phase modulation of one or more carrier microwave signals corresponding to resonance perturbations, said resonance perturbations arising in response to said ultrasound signal being received by said pressure sensitive microwave resonator; and
    analyzing, using a computer processing device, said at least one of: amplitude and phase modulation, and therefrom measuring said ultrasound signal;
    wherein said ultrasound signal effects pressure changes on said pressure sensitive microwave resonator and thereby perturbs said perturbable resonant frequency.

11. A method of verifying an ultrasound signal measurement obtained using the method of claim 10, comprising:
    characterizing a resonance of said pressure sensitive microwave resonator and thereby determining transmission and reflection spectra;
    connecting a high-frequency microwave source to said pressure sensitive microwave resonator, said high frequency microwave source being tuned proximate to a quadrature of said resonance;
    driving, using an ultrasound pulse transceiver, a train of ultrasound pulses through a piezoelectric transducer, said ultrasound pulses being applied to said pressure sensitive microwave resonator via a spacer;
    detecting, using an oscilloscope, signal trace pulses from both of said pressure sensitive microwave resonator and said piezoelectric transducer; and
    determining intervals between said signal trace pulses and therefrom verifying said ultrasound signal measurement.

12. The method of verifying an ultrasound signal measurement according to claim 11, further comprising:
    pressing said piezoelectric transducer against said spacer thereby deforming said spacer and reducing a distance between said piezoelectric transducer and said pressure sensitive microwave resonator; and determining intervals between said signal trace pulses and therefrom further verifying said ultrasound signal measurement.

* * * * *